UNITED STATES PATENT OFFICE.

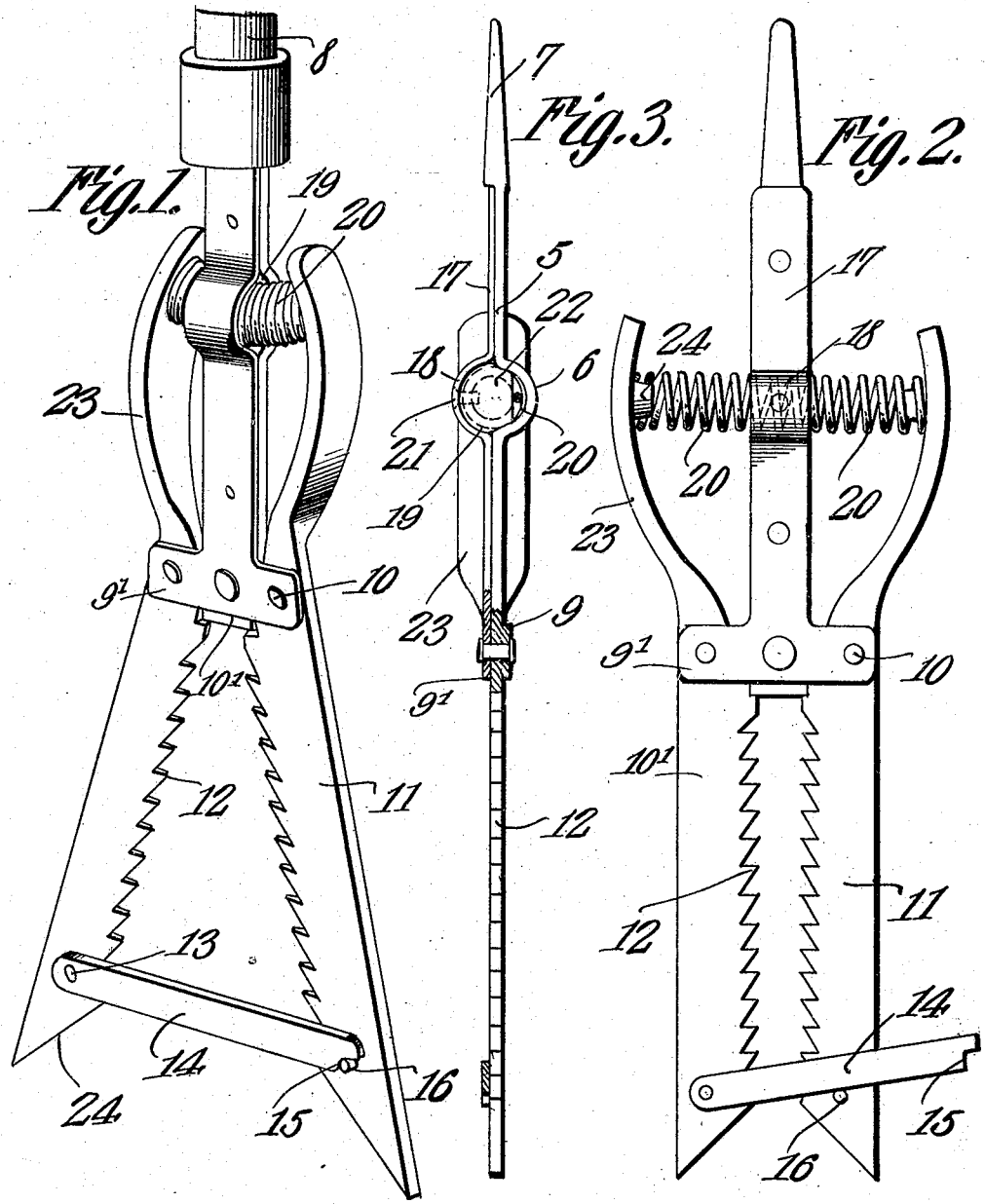

CARL SHRÓDER AND JOHN CHRISTIANSEN, OF LUCK, WISCONSIN.

FISH-IRON.

No. 911,167.      Specification of Letters Patent.      Patented Feb. 2, 1909.

Application filed July 28, 1908. Serial No. 445,804.

*To all whom it may concern:*

Be it known that we, CARL SHRÓDER and JOHN CHRISTIANSEN, citizens of the United States, residing at Luck, in the county of Polk, State of Wisconsin, have invented a new and useful Fish-Iron, of which the following is a specification.

This invention relates to fish irons and has for its object to provide a comparatively simple and inexpensive device of this character especially designed for catching fish as the latter lie dormant at the bottom of a stream or other body of water.

A further object of the invention is to provide a fish iron including co-acting spring actuated impaling jaws on one of which is pivotally mounted a trigger adapted to bear against a projection on the mating jaw for normally holding said jaws in open or operative position.

A further object is to form the impaling jaws with terminal finger pieces or handles so that said jaws may be readily moved to open or operative position without danger of the active ends of the jaws cutting or otherwise lacerating the hand of the operator.

A still further object of the invention is generally to improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a perspective view of a fish iron constructed in accordance with our invention showing the impaling jaws in open or operative position. Fig. 2 is a side elevation of the same showing the jaws in closed position. Fig. 3 is a vertical sectional view.

Similar numerals of reference indicate corresponding parts in all of the figures of the drawings.

The improved fish iron forming the subject matter of the present invention includes a longitudinally disposed shank 5 preferably in the form of a strip of flat metal having an intermediate portion thereof off set at 6 and its upper end provided with a terminal tang 7 adapted to be driven into an operating handle 8. Secured to or formed integral with the lower end of the shank 5 is a cross bar 9 between which and a similar cross bar 9' carried by a plate 17 are pivotally mounted at 10 a pair of co-acting impaling jaws 11. The inner longitudinal edges of the impaling jaws 11 are provided with teeth or serrations 12 preferably inclined in the direction of the bars 9 so as to prevent the escape of the fish when the jaws are moved to closed position. Pivotally mounted at 13 on one of the jaws 11 is a transverse bar or trigger 14, the opposite end of which is cut away to produce a shoulder 15 adapted to bear against a lug or projection 16 for holding the jaws in open position.

The plate 17 is riveted or otherwise rigidly secured to one side of the shank 5 and has its intermediate portion off set at 18 for registration with the off set portion 6 of the supporting shank, thereby to form a recess or chamber 19 for the reception of a coiled spring 20. Disposed within the chamber 20 and riveted or otherwise rigidly secured to the off set portion 18, as indicated at 21, is a partition or diaphragm 22 having one end thereof spaced from the adjacent wall of the off set portion 6 to permit the passage of the spring 20.

The upper ends of the impaling jaws 11 are extended longitudinally beyond the adjacent pivot pins 10 to form terminal outwardly curved finger pieces or handles 23, there being lugs 24 extending laterally from the inner faces of the finger pieces 23 for engagement with the adjacent convolutions of the spring 20.

It will here be noted that the partition or diaphragm 22 intersects one of the convolutions of the spring 20 so as to divide the spring into two sections, the diaphragm 22 forming a rigid abutment for the adjacent end of each spring section.

In operation the jaws are moved to open position by exerting an inward pressure on the finger pieces 23 which causes the shoulder 15 to engage the lug 16 and lock the jaws in open position. The operator lowers the device to the bottom of the stream by means of the handle 8. As a fish comes in contact with the trigger 14 the shoulder 15 will be disengaged from the lug 16 thus causing the spring 20 to move the jaws 11 to closed position and impale the fish thereby effectually preventing the escape of the latter.

Attention is here called to the fact that the trigger 14 rests upon the pin or projection 16 when the device is in closed or inoperative position so that when the jaws are moved to open position the lower longitudinal edge of the trigger 14 will ride over the pin 16 until the notch registers therewith when the shoulder 15 will automatically engage the pin thus permitting the setting of the device without the necessity of manually grasping the active ends of the impaling jaws and without lacerating or otherwise injuring the hand of the operator. It will also be noted that the lower end of the shank 5 projects below the adjacent cross bars of said shank and between the clamping jaws, as indicated at 10', thereby to limit the inward movement of said jaws.

The lower ends of the impaling jaws 11 are preferably inclined or beveled at 24 to assist in guiding the fish between the jaws and in contact with the trigger 14.

In some cases the shank of the implement may be formed of a single piece of metal instead of being constructed in two pieces riveted together.

While the device is principally designed for catching fish it is obvious that the same may be used with equally good results as a trap for catching animals of different kinds. It will also be understood that the handle 8 may be detached and the tang 7 embedded in the ground so that the device may be used as a trap for catching musk-rats and the like.

From the foregoing description it will be seen that there is provided an extremely simple, inexpensive and efficient device admirably adapted for the attainment of the ends in view.

Having thus described the invention what is claimed is:

1. A device of the class described including a shank, co-acting impaling jaws pivotally mounted on the shank and each having one end thereof extended longitudinally beyond the adjacent pivot to form a finger piece, a spring interposed between said finger pieces, and a trigger pivotally mounted on one of the jaws and adapted to engage the mating jaw for supporting said jaws in open position, the lower end of the shank being extended between the jaws to form a stop for limiting the closing movement of said jaws.

2. A device of the class described including a shank having an intermediate chamber, a pair of co-acting impaling jaws pivotally mounted on the shank and each having one end thereof extended longitudinally beyond the adjacent pivot to form a terminal finger piece, a spring seated in the chamber and bearing against the adjacent finger pieces, a diaphragm secured to one wall of the chamber and intersecting one of the convolutions of the spring, and a trigger pivotally mounted on one of the impaling jaws and engaging the adjacent jaw for locking said jaws in open position.

3. A device of the class described including a shank provided with an intermediate chamber, a cross head secured to one end of the shank, co-acting impaling jaws pivotally mounted on the cross head and each having one end thereof extended longitudinally beyond the adjacent pivot to form a terminal finger piece, a coiled spring seated in the chamber and having its opposite end bearing against the adjacent finger pieces, a diaphragm seated in said chamber and intersecting one of the convolutions of the spring, one wall of the diaphragm being spaced from the adjacent walls of the chamber to permit the passage of said spring, a projection extending laterally from one of the impaling jaws, and a trigger pivotally mounted on the mating jaw and provided with a terminal shoulder adapted to bear against the projection for holding said jaws in open position.

4. A device of the class described including a shank having an intermediate portion thereof off set and one end thereof provided with a tang for engagement with a supporting handle, spaced cross bars secured to the opposite end of the shank, a plate secured to said shank and having an intermediate portion thereof off set and adapted to register with the off set portion of the shank to form a chamber, a diaphragm seated in said chamber, co-acting impaling jaws pivotally mounted between the cross bars and each having one end thereof extended longitudinally beyond the adjacent pivot and thence curved laterally to form a terminal finger piece, a coiled spring bearing against the inner faces of the terminal finger pieces and having some of its convolutions bearing against the diaphragm, a projection extending laterally from one of the impaling jaws, a trigger pivotally mounted on the mating jaw and provided with a terminal shoulder adapted to engage the projection for holding the jaws in open position, the inner longitudinal edges of the impaling jaws being provided with teeth and the terminals thereof inclined in the direction of said teeth.

In testimony that we claim the foregoing as our own, we have hereto affixed our signatures in the presence of two witnesses.

CARL SHRÖDER.
JOHN CHRISTIANSEN.

Witnesses:
  J. P. PETERSON,
  M. M. PETERSON.